(12) United States Patent
Coskuner

(10) Patent No.: US 8,746,334 B2
(45) Date of Patent: Jun. 10, 2014

(54) MICROBIAL ENHANCED OIL RECOVERY PROCESS FOR HEAVY OIL ACCUMULATIONS

(75) Inventor: Gokhan Coskuner, Calgary (CA)

(73) Assignee: Husky Oil Operations Limited, Calgary (CA)

( * ) Notice: Subject to any disclaimer, the term of this patent is extended or adjusted under 35 U.S.C. 154(b) by 228 days.

(21) Appl. No.: 13/313,776

(22) Filed: Dec. 7, 2011

(65) Prior Publication Data

US 2013/0146280 A1  Jun. 13, 2013

(51) Int. Cl.
*E21B 43/22* (2006.01)

(52) U.S. Cl.
USPC .......................... 166/246; 166/309; 166/371

(58) Field of Classification Search
None
See application file for complete search history.

(56) References Cited

U.S. PATENT DOCUMENTS

| | | | |
|---|---|---|---|
| 3,032,472 | A | 5/1962 | Hitzman |
| 5,083,611 | A | 1/1992 | Clark et al. |
| 2007/0248531 | A1 | 10/2007 | Debryun et al. |
| 2007/0251146 | A1 | 11/2007 | Larter et al. |
| 2007/0298479 | A1 | 12/2007 | Larter et al. |
| 2009/0130732 | A1 | 5/2009 | Fedorak et al. |

FOREIGN PATENT DOCUMENTS

| | | |
|---|---|---|
| CA | 2317714 | 7/1999 |
| CA | 2672487 A1 | 6/2008 |
| WO | 2008128331 A1 | 10/2008 |

OTHER PUBLICATIONS

Al-Sulaimani, H. et al., "Microbial Biotechnology for Enhancing Oil Recovery: Current Developments and Future Prospects," Biotechnology, Bioinformatics and Bioengineering 1(2):147-158, 2011.

Bryan, J. et al., "Processes Responsible for Heavy-Oil Recovery by Alkali/Surfactant Flooding," Journal of Petroleum Technology, 2008 SPE Improved Oil Recovery Symposium, Society of Petroleum Engineers, Tulsa, Oklahoma, Apr. 19-23, 2008, pp. 52-54, and 88.

Dusseault, M. et al., "Cold Heavy Oil Production with Sand in the Canadian Heavy Oil Industry," Published by the Alberta Department of Energy, Mar. 2002, 428 pages.

Gray, M. R. et al., "Potential Microbial Enhanced Oil Recovery Processes: A Critical Analysis," SPE 114676, 2008 SPE Annual Technical Conference and Exhibition (ATCE), Society of Petroleum Engineers, Denver, Colorado, Sep. 21-24, 2008, 25 pages.

Liu, X. et al., "A Fractal Wormhole Model for Cold Heavy Oil Production," Journal of Canadian Petroleum Technology 44(9):31-36, Sep. 2005.

Miller, K. A. et al., "Preliminary Result from a Solvent Gas Injection Field Test in a Depleted Heavy Oil Reservoir," Journal of Canadian Petroleum Technology 42(2):50-61, Feb. 2003.

Sawatzsky, R. et al., "Tracking Cold Production Footprints," Paper 2002-086, Canadian International Petroleum Conference, Petroleum Society, Canadian Institute of Mining, Metallurgy and Petroleum, Calgary, Alberta, Jun. 11-13, 2002, 16 pages.

Smith, G. E., "Fluid Flow and Sand Production in Heavy Oil Reservoirs under Solution-Gas Drive," SPE Production Engineering, May 1988, pp. 169-180.

Tan, T. et al., "A New Methodology for Modelling of Sand Wormholes in Field Scale Thermal Simulation," Journal of Canadian Petroleum Technology 4(4):16-21, Apr. 2005.

Tremblay, B. et al., "CT Imaging of Wormhole Growth under Solution-Gas Drive," SPE Reservoir Evaluation and Engineering 2(1):35-47, Feb. 1999.

Office Action mailed Sep. 24, 2012, issued in corresponding Canadian Application No. 2,761,048, filed Dec. 7, 2011.

*Primary Examiner* — Zakiya W Bates

(74) *Attorney, Agent, or Firm* — Frost Brown Todd LLC

(57) ABSTRACT

A post cold heavy oil production with sand ("CHOPS") microbial enhanced oil recovery method comprises selecting a well having at least one wormhole and that has completed primary CHOPS production. When the reservoir does not contain enough of a gas producing indigenous microbe, an injectant is prepared comprising a gas-producing microbe, a nutrient suitable for the microbe, and a fluid base. The injectant is injected through the well and into the at least one wormhole in the reservoir; the well is shut in until pressure in the well reaches the target pressure; and then the well is produced.

18 Claims, 4 Drawing Sheets

MICROBIAL ENHANCED OIL RECOVERY PROCESS FOR HEAVY OIL ACCUMULATIONS

BACKGROUND

1. Technical Field

The present invention relates generally to a process wherein nutrients and/or microbial organisms are injected into underground formations for microbial processes, and in particular to a microbial enhanced oil recovery ("MEOR") process for heavy oil accumulations.

2. Description of the Related Art

Production of heavy oil from unconsolidated reservoirs, like the ones around Lloydminster which straddles the provinces of Alberta and Saskatchewan in Canada, continued for decades while trying to prevent sand production with screens or gravel packs. The oil and gas industry realized in the 1980s that if sand production was encouraged, that oil production also increased. A non-thermal process was developed known as Cold Heavy Oil Production with Sand (CHOPS) in which sand and oil were produced simultaneously under primary conditions. Progressive cavity pumps were typically deployed in a CHOPS process and allowed sand production and higher levels of oil production to be reached over prior approaches.

As a result of producing sand from these reservoirs, pathways of extremely high permeability are generated in oil producing formations. These high permeability pathways are known as "wormholes". As the sand production is continued, wormholes grow larger and extend deeper into the reservoir. The presence of wormholes has been proposed in light of the observations in these oil fields and from investigations through laboratory experiments (Tremblay, B., Sedgwick, G. and Vu, D., "CT Imaging of Wormhole Growth Under Solution-Gas Drive", SPE Reservoir Evaluation & Engineering, Vol. 2, No. 1, February 1999, 35-47). Numerous tracer surveys were conducted where rapid communication was observed between wells confirming the existence of wormhole structures. Pressure-buildup analyses conducted throughout the Lloydminster area showed in-situ permeability values on the order of tens of darcies, which was much higher than anything measured in the laboratory (Smith, G. E., "Fluid Flow and Sand Production in Heavy Oil Reservoirs Under Solution Gas Drive", SPE Production Engineering, May 1988, 169-180). Such values are theorized to be due to the flow through the high permeability channels or wormholes. The test results also indicated that wells have very large "wellbore storage," even for the wells that were shut in downhole. Furthermore, laboratory experiments showed that a stable wormhole can develop in unconsolidated heavy oil sands and that the wormholes most likely develop in a higher porosity region with lower cohesive strength (Tremblay et al., supra). Tracer tests conducted by injecting in one well and detecting the arrival times in the surrounding wells sometimes indicated travel times in the order of hours, lent further credence to the existence of wormholes in the reservoir. It is thought that near the wellbore a denser network/dilated region is formed and a few of these wormholes grow up to 50 to 200 m in length in time (Smith, supra). FIG. 1 (PRIOR ART) shows a schematic of aerial view of a CHOPS well 1 with associated wormhole network 2.

Solution gas drive in these reservoirs involves simultaneous mixture flow of gas as very tiny bubbles entrained in viscous heavy oil, also called foamy oil flow. Foamy oil flow is a result of nonequilibrium thermodynamics. Therefore, two significant mechanisms which are theorized to affect the flow of heavy oil and its recovery in these reservoirs are the foamy oil flow and wormhole formation (Sawatzky, R., Lillico, D. A., London, M., Tremblay, B. R., and Coates, R. M., "Tracking Cold Production Footprints"; paper 2002-086, presented at the Canadian International Petroleum Conference, Calgary, AB, Jun. 11-13, 2002). The primary CHOPS production wells come to the end of their lives either due to pressure depletion or due to excessive water influx. In general, the primary recovery in heavy oil reservoirs ranges between 3 to 10% with average of around 5% recovery (Smith, supra). Although a few enhanced oil recovery ("EOR") techniques have been tried, currently there are no widely applicable commercial EOR techniques to increase the recovery of cold heavy oil beyond the primary levels.

Water flooding of heavy oil is inefficient. Water will bypass the oil and breakthrough at the producers early in the life of the flood because of viscous instabilities resulting from the adverse mobility contrast between water and heavy oil. Many of these reservoirs are relatively small or thin, and possibly have existing primary production wormholes. Consequently, these reservoirs are not prime candidates for expensive thermal or miscible hydrocarbon solvent EOR technologies. Wormholes negatively affect water flood performance as well (Bryan, J., Mai, A., and Kantzas, A, "Processes Responsible for Heavy Oil recovery by Alkali/Surfactant Flooding", JPT, January 2009, 52-54). Considerable water is produced sometimes in these reservoirs during primary operations. As long as water production is low, quite high sand cuts can be tolerated by the production system. If wormholes reach a water source, water will short circuit through them and the well will be suspended. Many sudden failures in injection schemes (firefloods, water floods, and steam floods) and in drilling and workover operations are also blamed on wormholes.

BRIEF SUMMARY

According to one aspect of the invention, a post-CHOPS MEOR method comprises selecting a well in communication with a reservoir having at least one wormhole and that is being subjected to or has completed primary CHOPS production and determining whether the reservoir contains a sufficient amount of a gas-producing indigenous microbe to re-pressurize a drainage portion of the well to a target pressure or to generate a target amount of gas. When the reservoir does not contain a sufficient amount of the indigenous microbe, then an injectant is prepared comprising a sufficient amount of a gas-producing microbe to re-pressurize the drainage portion of the well to the target pressure or to generate the target amount of gas, a nutrient suitable for the microbe, and a fluid base. When the reservoir does contain a sufficient amount of the gas producing indigenous microbe, then an injectant is prepared comprising a suitable nutrient for the indigenous microbe and the fluid base. The injectant is injected through the well and into the wormhole(s) in the reservoir, the well is shut in until the pressure in the well reaches the target pressure or the target amount of gas is generated, and the well is produced.

When the reservoir does not contain a sufficient amount of the indigenous microbe, the injectant can comprise a gas producing microbe selected from the group consisting of an exogenous microbe and a cultivated microbe that has been cultivated from a sample of the indigenous microbe in the well. The exogenous microbe can be selected from a group consisting of: clostridium, desulfovibrio, pseudomonas, methanogens, and anaerobic fermenters. The nutrient for the exogeneous microbe can be a carbohydrate source other than residual hydrocarbons in the well. In particular, the nutrient can be selected from a nutrient group consisting of: molasses, sugar plant waste, malting waste, and manure. When the exogenous microbe is a methanogen or an anaerobic fermenter, the nutrient group can further consist of $NaNO_3$, $KNO_3$, $NH_4NO_3$, $K_2PO_4$, $NH_4Cl$, folic acid, ascorbic acid and riboflavin.

The injectant can be injected through the well and into the reservoir at a temperature equal to the reservoir temperature, and at a pressure greater than the reservoir pressure and less than the formation fracturing pressure of the reservoir.

The sufficient amount of the microbe can be an amount required for the microbe to re-pressurize the drainage portion of the well to the target pressure within a selected period of time. Alternatively, the sufficient amount of the microbe can be an amount required for the microbe to produce the target amount of biogas within a selected period of time. The target pressure can be the initial reservoir pressure during primary production, the target amount of biogas can be 2,000,000 $m^3$ and the selected period can be between six months and one year. When the reservoir does contain a sufficient amount of the indigenous microbe, the method can further comprise selecting a sufficient amount of nutrient for the indigenous microbe to cause the indigenous microbe to generate a sufficient amount of biogas to re-pressurize the drainage portion of the well to the target pressure within a selected shut-in period, or produce the target amount of biogas within the selected shut-in period. The target pressure can be the initial reservoir pressure during primary production and the target period can be between six months and one year.

According to another aspect of the invention, there is provided a post CHOPS MEOR method comprising: selecting a well in communication with a reservoir having at least one wormhole and that is being subjected to or has completed CHOPS production; preparing an injectant comprising a sufficient amount of a gas-producing exogenous microbe to re-pressurize a drainage portion of the well to a target pressure or to generate a target amount of gas, a nutrient suitable for the exogenous microbe, and a fluid base; injecting the injectant through the well and into the at least one wormhole in the reservoir; shutting in the well until the pressure in the well reaches the target pressure or the target amount of gas has been generated; and producing the well.

According to yet another aspect of the invention, there is provided an apparatus for carrying out a post CHOPS MEOR method on a reservoir having at least one wormhole and that is being subjected to or has completed primary CHOPS production. The apparatus comprises: an injectant tank comprising a fluid mixture of an aqueous fluid base, a nutrient for a gas-producing microbe, and optionally the gas producing microbe; a fluid conduit fluidly coupling the injectant tank to a wellhead of a well in fluid communication with the reservoir; a pump fluidly coupled to the fluid conduit and operable to inject the injectant into the well at a pressure sufficient to deliver the injectant into reservoir and at least one wormhole. The pump can be configured to inject the injectant at a pressure between the reservoir pressure and a formation fracturing pressure of the reservoir.

DETAILED DESCRIPTION

Figure 1:
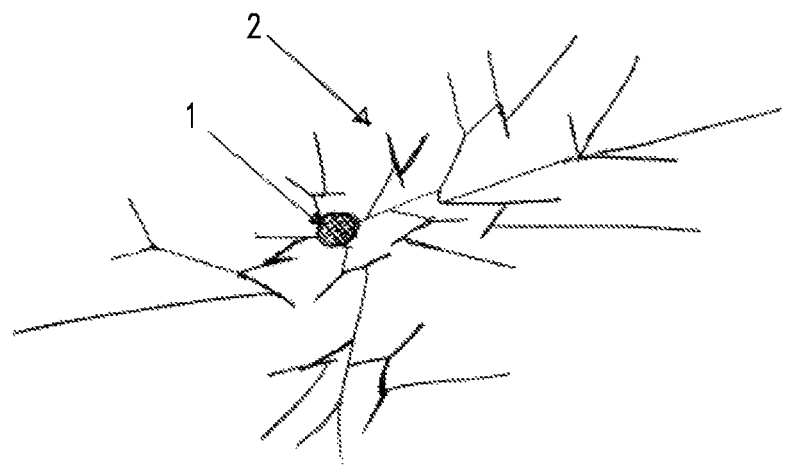
FIG. 1 is a schematic of an aerial view of a CHOPS well with an associated wormhole network according to the prior art.

The embodiments described herein relate generally to a process wherein nutrients and/or microbial organisms are injected into underground formations for microbial processes. In particular, the described embodiments provide a method of injecting microbial organisms and/or nutrients into wormholes in a heavy oil formation that is undergoing or has already undergone primary CHOPS production (hereinafter referred to as "post-CHOPS MEOR process"). Typically, the post-CHOPS MEOR process will be carried out on the well after primary CHOPS production has been completed. Alternatively, the post-CHOPS MEOR process can be introduced during primary CHOPS production (i.e., after primary CHOPS production has started but before its economic end is reached) when a significant amount of wormhole network has been generated. One measure of determining when such a wormhole network exists is to measure the cumulative sand production from the well. Alternatively, the pressure build-up in the well can be analyzed to determine the in-situ permeability of the reservoir. In particular, it is expected that a sufficient wormhole network has been developed when several hundred cubic meters of sand has been cumulatively produced, and/or when the in-situ reservoir permeability is determined to be in the order of tens of darcies. In particular, a significant network is expected to be generated when more than 200 $m^3$ of sand has been cumulatively produced or when the in-situ permeability has been determined to be above ten darcies.

The presence of wormholes makes it possible to inject sufficient quantities of microbial organisms and nutrients into the heavy oil formation in a fashion that is concentrated around the wellbore and generate biogas in situ. Wormholes also allow for the generated biogas to contact heavy oil over a large surface area created by wormholes. Examples of the biogas generated can be hydrogen, methane, or carbon dioxide. The gas generated within wormholes in the formation re-pressurizes the reservoir providing additional energy to push more oil towards the producer. Some of the generated biogas in the wormholes will be dissolved in heavy oil and upon production enhance the solution gas drive mechanism resulting in enhanced foamy oil flow.

High viscosity of the heavy oil presents challenges in the production of these reservoirs. In order to avoid further degrading the heavy oil in the formation by the injected microbial organisms, injected nutrients are preferentially consumed by the injected bacteria.

If the heavy oil reservoir does not contain any wormholes because the sand production has been prevented or because there has been no primary production, then the injection of microbial organisms and nutrients will face the same disadvantages as a water flood does. Injected microbial organism solutions and the nutrients will have significantly more mobility than the heavy oil in the formation. The results will be that significant portions of the heavy oil in the formation will be bypassed in the form of viscous fingers because of the adverse mobility ratio between the heavy oil and the injected fluids. The viscous fingers of microbes and nutrients will penetrate into the formation far away from the wellbore thus spreading the biogas generated over a large area. In this case, it will be impossible or uneconomic to re-pressurize the reservoir over such a large area.

The current embodiments overcome this problem by placing the microbial organisms and/or nutrients within the existing wormholes generated by CHOPS. As the wormholes are mostly within a 50 to 200 m radius of the wellbore, being denser near the wellbore and less dense away from the wellbore, the immediate vicinity of the wellbore will largely be affected. First, the formation water in the reservoir coupled to the wellbore is analyzed and then a determination is made as to whether suitable indigenous gas generating microbial consortia are present in the reservoir. If not present, then a first embodiment of the post-CHOPS MEOR process is performed which involves injecting both exogenous microbes and nutrients for those microbes into the reservoir. If present, then a second embodiment of the post-CHOPS MEOR process is performed which involves only injecting nutrients for the indigenous microbes into the reservoir. If the indigenous microbes are not present in sufficient quantities, then they can be cultivated and injected.

Figure 2:
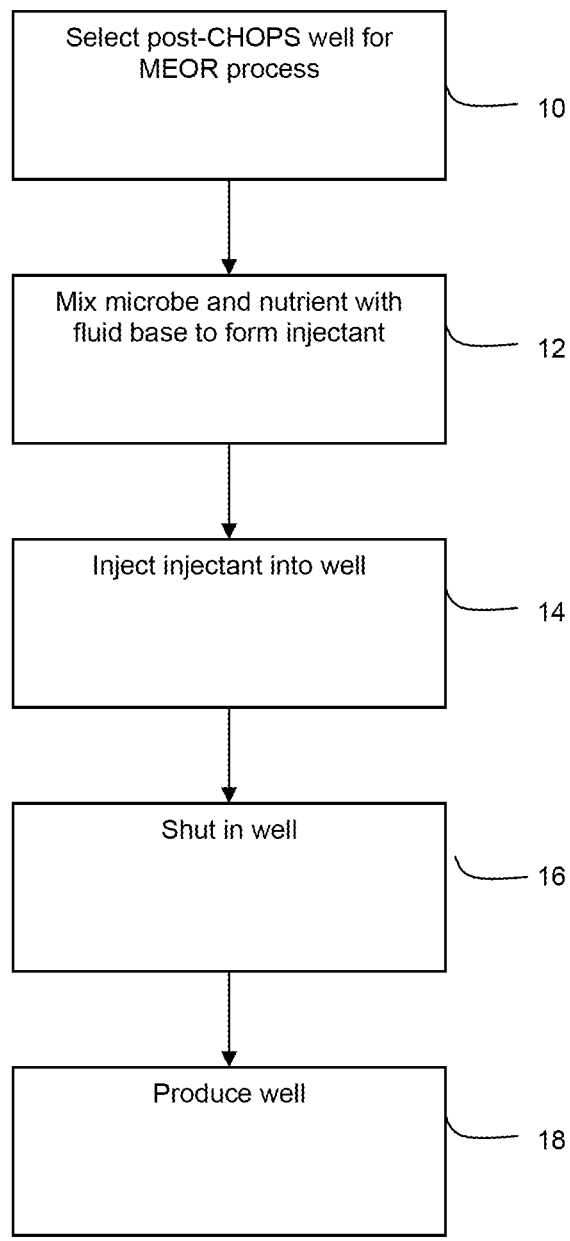
FIG. 2 is a flowchart of steps in a post-CHOPS MEOR process according to a first embodiment of the invention.

Referring now to FIG. 2 and according to a first embodiment, a single well, or multiple wells in communication being operated in a huff-and-puff mode, which have undergone a primary CHOPS process ("post-CHOPS wells") are selected for the post-CHOPS MEOR process (step 10). Then, gas producing species of microbial organisms ("exogenous microbes") and suitable nutrients for these microbes are selected for the post-CHOPS MEOR process, and prepared for injection (step 12). The exogenous microbes and their nutrients can be selected from those gas-producing species of microbes and their nutrients currently used in conventional MEOR processes and include but not limited to: Clostridium, Desulfovibrio, and Pseudomonas. These bacteria can ferment carbohydrates to produce biogas. Therefore, carbohydrate sources such as molasses, sugar plant waste streams, malting wastes, manure and others that contain all the necessary nutritional components (e.g., carbon, nitrogen, phosphorous, etc.) are suitable nutrients can be injected into the formation along with the microbes. Other suitable microbes include methane producing (methanogen) and $CO_2$ producing microbes (anaerobic fermenters). These microbes will have fast enough rates of growth and gas production using low cost carbon sources other than oil, in the severe high salinity and hydrocarbon containing conditions of the post-CHOPS wells. Types of low cost carbon sources to serve as nutrients for these microbes include: molasses, sugar plant waste streams, malting wastes, sugar, manure, and residual hydrocarbons in the reservoir. Other additives could include: nutrients containing nitrogen and phosphorous such as $NaNO_3$, $KNO_3$, $NH_4NO_3$, $K_2PO_4$, $NH_4Cl$, vitamins such as folic acid, ascorbic acid and riboflavin, and trace elements.

The selected exogenous microbes can be cultivated from exogenous samples. Alternatively, the exogenous microbes can be cultivated from naturally occurring microbes such as methanogens and anaerobic fermenters, which can be isolated from samples taken at the well or other sites where microbes tolerant to high salt and to hydrocarbons are prevalent and appropriate nutrients to grow them are determined.

Figure 3:
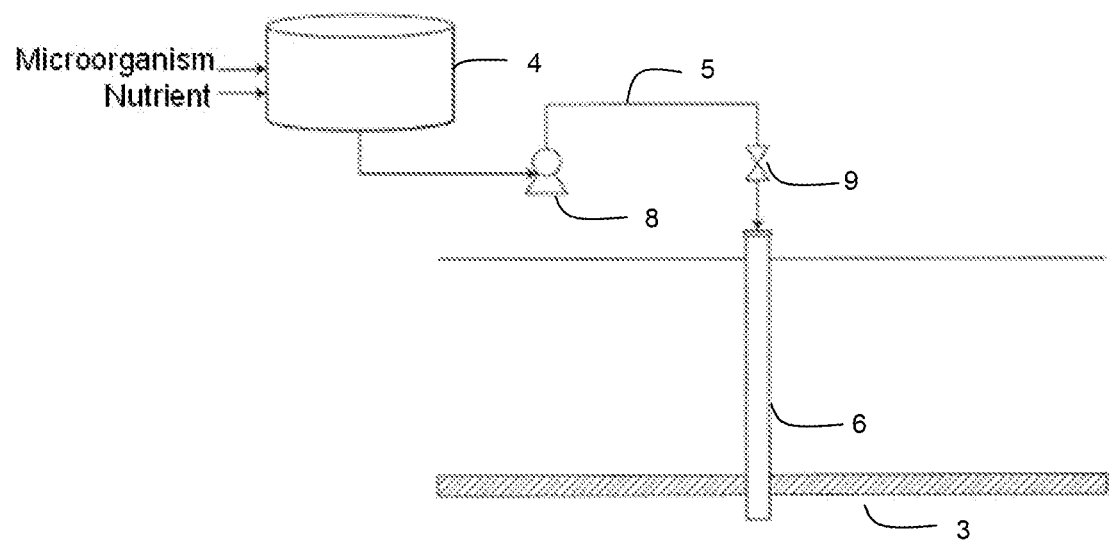
FIG. 3 is a schematic of equipment used to carry out the post-CHOPS MEOR process.

Referring to FIG. 3, an injectant delivery system is fluidly coupled to a post-CHOPS well 6 and serves to inject an injectant comprising a fluid mixture of nutrients and exogenous microbes in an aqueous fluid base into the well 6. The injectant delivery system 2 comprises an injectant tank 4 for containing the injectant, a fluid conduit 5 in fluid communication with the tank 4 and a wellhead of the post-CHOPS well 6, a pump coupled 8 to the conduit 5, and a control valve 9 coupled to the conduit 5 near the wellhead. The post-CHOPS well(s) 6 extend downhole and are in fluid communication with a subsurface reservoir 3 containing the wormholes.

The injectant is prepared by mixing the selected microbial organisms and suitable nutrients with an aqueous fluid base in a mixing tank 4 to form a microbe/nutrient fluid mixture. A suitable concentration of exogenous microbes and nutrients in the injectant is determined by selecting a sufficient amount of exogenous microbes that would generate commercially viable amounts of biogas in the reservoir formation; one definition of a commercially viable amount of biogas is enough biogas to significantly repressurize a drainage area of the well 6 to a target pressure within a selected period of time. For example, a selected amount of exogenous microbes can be selected to generate enough biogas to re-pressurize a drainage area of the well 6 to about the initial reservoir pressure during primary CHOPS production within six months. Alternatively, a commercially viable amount of biogas can be defined by the volume of biogas produced within a certain period of time, and can for example be about 2,000,000 m3 of biogas produced within six months of shut-in.

Once the amount of exogenous microbes has been selected, a suitable amount of nutrients can be selected, which is the amount that needs to be injected into the well 6 to enhance that rate of gas generation by the exogenous microbes to produce the expected amount of biogas within the selected period of time.

Referring again to FIG. 2, the injectant is injected into the post-CHOPS well 6 at a selected injection pressure and a selected injection temperature (step 14). In most cases, it is expected that the selected injection temperature will be at or about the same as the reservoir temperature (about 15° C. in Lloydminster area). The selected injection pressure should be greater than the reservoir pressure and be sufficient to cause the injectant to flow easily into the reservoir 3 and preferentially fill the wormholes but not cause the reservoir formation to fracture, i.e., be below the formation fracturing pressure of the reservoir. Injection continues until there is enough injectant in the reservoir 3 to generate a target amount of biogas within the selected period of time.

After the selected amount of injectant has been injected into the well 6, the well 6 is shut in for the selected period of time, to allow biogas to be generated within the wormholes (step 16). Conventional means for shutting in wells (not shown) can be used as is known in the art. The selected period of time, i.e., the shut in period, can be selected by the operator at its preference, and can be for example between six months and one year. As noted above, once the shut-in period has been selected, the amount of injectant can be calculated that is required to produce enough biogas to reach the target pressure within the selected shut-in period or produce enough biogas within the shut-in period. The target pressure in this embodiment is substantially the same as the initial reservoir pressure during primary CHOPS production; however, the MEOR process can work at pressures below the initial reservoir pressure, although this would present less than ideal conditions. During the shut in period, the reservoir pressure is monitored and when the pressure is observed to be close to the target pressure, the shut-in period is ended.

After the shut-in period has been completed the well 6 is then put on production and oil and gas is produced (step 18). The well 6 is produced in the same manner as a conventional CHOPS well with progressive cavity pumps during primary CHOPS production.

Figure 4:
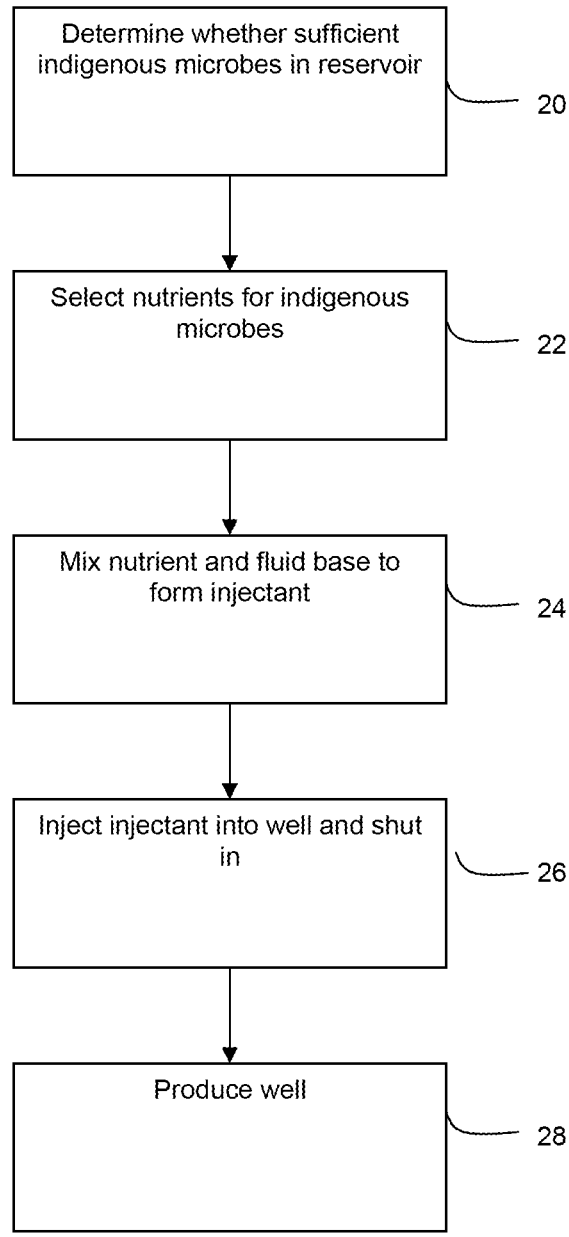
FIG. 4 is a flowchart of steps in a post-CHOPS MEOR process according to a second embodiment of the invention.

According to a second embodiment and referring to FIG. 4, the post-CHOPS MEOR process utilizes indigenous gas-producing microbes, i.e., microbes already present in the reservoir 3. In this embodiment, a determination is made as to whether any indigenous gas generating microbial consortia (hereinafter referred to as "indigenous microbes") are present in the reservoir 3 (step 20). If the formation contains suitable species of indigenous microbes and in sufficient concentrations, then one or more nutrients suitable to these indigenous microbes are selected (step 22) and mixed with an aqueous fluid base in the mixing tank 4 to form the injectant (step 24). This injectant is injected by the injectant delivery system 2 into the reservoir 3 (step 26) to promote gas production of the indigenous microbes. Once sufficient injectant has been injected, the well is shut in for a selected period. Once the shut in period has been completed, the well is produced (Step 28).

To determine the amount of nutrient to be injected into the well 6, the formation water in the reservoir 3 is analyzed and then a determination is made of the total amount of nutrient that needs to injected at a well head to enhance the rate of gas generation by the indigenous microbes so as to provide for commercially viable amounts of biogas in the reservoir formation. In one embodiment, commercially viable amounts would include enough biogas generation to significantly repressurize a drainage area of the well within six months. In this embodiment, the amount of biogas generated during this time frame is expected to be 2,000,000 m3.

The nutrients should be added to the reservoir 3 in a manner that does not significantly alter the bulk salinity and make-up of the formation water while at the same time allowing rapid dispersion of the nutrients into as much of the formation water as possible.

The maximum concentration of nutrient in the well should be determined such that the nutrient concentration is non-lethal to the gas generating microbial consortia but enhances gas generation. In determining this maximum concentration, consideration should be given to the amount of nutrients already in the reservoir such that the total nutrient concentration does not exceed the lethal concentration.

If a suitable species of indigenous microbial consortia is present in the reservoir but in insufficient quantities, then according to an alternative embodiment, a sample of these indigenous microbes can be extracted from the reservoir and cultivated in a facility. Once a sufficient amount has been cultivated, the cultivated microbes are mixed with a suitable nutrient and fluid base in the mixing tank to form an injectant. The injectant is then injected into the reservoir in a manner according to the first embodiment.

While embodiments of the present invention has been described in this detailed description, it will be understood to those skilled in the art that changes and alternatives can be made to these embodiments within the scope and spirit of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A post cold heavy oil production with sand ("CHOPS") microbial enhanced oil recovery ("MEOR") method comprising:
   (a) selecting a well in communication with a reservoir having at least one wormhole and that is being subjected to or has completed primary CHOPS production;
   (b) determining whether the reservoir contains a sufficient amount of a gas-producing indigenous microbe to enhance oil recovery by re-pressurizing a drainage portion of the well to a target pressure or by generating a target amount of gas;
   (c) when the reservoir does not contain a sufficient amount of the indigenous microbe, then preparing an injectant comprising a sufficient amount of a gas-producing microbe to re-pressurize the drainage portion of the well to the target pressure or to generate the target amount of gas, a nutrient suitable for the microbe, and a fluid base;
   (d) when the reservoir does contain a sufficient amount of the gas producing indigenous microbe, then preparing an injectant comprising a suitable nutrient for the indigenous microbe and the fluid base;
   (e) injecting the injectant through the well and into the at least one wormhole in the reservoir;
   (f) shutting in the well until the pressure in the well reaches the target pressure or the target amount of gas is generated; and
   (g) producing oil from the well.

2. A method as claimed in claim 1 wherein when the reservoir does not contain a sufficient amount of the indigenous microbe, the injectant comprises a gas producing microbe selected from the group consisting of an exogenous microbe and a cultivated microbe that has been cultivated from a sample of the indigenous microbe in the well.

3. A method as claimed in claim 2 wherein the injectant comprises the exogenous microbe which is selected from a group consisting of: clostridium, desulfovibrio, pseudomonas, methanogens, and anaerobic fermenters.

4. A method as claimed in claim 3 wherein the nutrient for the exogenous microbe is a carbohydrate source other than residual hydrocarbons in the well.

5. A method as claimed in claim 4 wherein the nutrient is selected from a nutrient group consisting of: molasses, sugar plant waste, malting waste, and manure.

6. A method as claimed in claim 5 wherein the exogenous microbe is a methanogen or an anaerobic fermenter and the nutrient group further consists of $NaNO_3$, $KNO_3$, $NH_4NO_3$, $K_2PO_4$, $NH_4Cl$, folic acid, ascorbic acid and riboflavin.

7. A method as claimed in claim 1 wherein the injectant is injected through the well and into the reservoir at a temperature equal to the reservoir temperature.

8. A method as claimed in claim 1 wherein the injectant is injected through the well and into the reservoir at a pressure greater than the reservoir pressure and less than the formation fracturing pressure of the reservoir.

9. A method as claimed in claim 1 wherein the selected target pressure is the initial reservoir pressure during primary production.

10. A method as claimed in claim 1 wherein the sufficient amount of the microbe is an amount required for the microbe to re-pressurize the drainage portion of the well to the target pressure within a selected period of time.

11. A method as claimed in claim 10 wherein the target pressure is the initial reservoir pressure during primary production and the target period is between six months and one year.

12. A method as claimed in claim 1 wherein the sufficient amount of the microbe is an amount required for the microbe to produce the target amount of biogas within a selected period of time.

13. A method as claimed in claim 12 wherein the target amount of biogas is 2,000,000m$^3$ and the target period is between six months and one year.

14. A method as claimed in claim 1 wherein the reservoir does contain a sufficient amount of the indigenous microbe, and the method further comprises selecting a sufficient amount of nutrient for the indigenous microbe to cause the indigenous microbe to generate a sufficient amount of biogas to re-pressurize the drainage portion of the well to the target pressure within a selected shut-in period, or produce the target amount of biogas within the selected shut-in period.

15. A method as claimed in claim 14 wherein the target pressure is the initial reservoir pressure during primary production and the selected shut-in period is between six months and one year.

16. A post cold heavy oil production with sand ("CHOPS") microbial enhanced oil recovery ("MEOR") method comprising:

(a) selecting a well in communication with a reservoir having at least one wormhole and that is being subjected to or has completed CHOPS production;
(b) preparing an injectant comprising an amount of a gas-producing exogenous microbe sufficient to enhance oil recovery by re-pressurizing a drainage portion of the well to a target pressure or by generating a target amount of gas, a nutrient suitable for the exogenous microbe, and a fluid base;
(c) injecting the injectant through the well and into the at least one wormhole in the reservoir;
(d) shutting in the well until the pressure in the well reaches the target pressure or the target amount of gas has been generated; and
(e) producing oil from the well.

17. A method as claimed in claim 16 wherein the target pressure is the initial reservoir pressure during primary production.

18. A method as claimed in claim 16 wherein the target amount of gas generated is 2,000,000 m$^3$.

\* \* \* \* \*